(12) United States Patent
Lee

(10) Patent No.: US 6,895,367 B1
(45) Date of Patent: May 17, 2005

(54) METHODS AND APPARATUS FOR MODELING AND VERIFYING A SET OF PCI BUS TRANSACTIONS

(75) Inventor: Douglas Lee, Cupertino, CA (US)

(73) Assignee: Adaptec, Inc., Milpitas, CA (US)

( * ) Notice: Subject to any disclaimer, the term of this patent is extended or adjusted under 35 U.S.C. 154(b) by 167 days.

(21) Appl. No.: 10/300,452

(22) Filed: Nov. 19, 2002

(51) Int. Cl.[7] .............................................. G06F 19/00
(52) U.S. Cl. ...................................... 702/186; 709/208
(58) Field of Search ........................ 702/186, 182–185, 702/187; 710/110; 709/208, 209

(56) References Cited

U.S. PATENT DOCUMENTS 5,949,981 A * 9/1999 Childers ..................... 710/310
5,996,036 A * 11/1999 Kelly ......................... 710/110
6,144,888 A * 11/2000 Lucas et al. .................. 700/83

* cited by examiner

*Primary Examiner*—Edward Raymond
(74) *Attorney, Agent, or Firm*—IP Strategy Group PC (57) ABSTRACT

A method for modeling and verifying a set of transactions between a set of master devices and a set of slave devices that are coupled via a bus. The method includes determining a set of dependencies for the set of transactions, executing the set of transactions on the bus, and observing the set of transactions for the dependencies. If the set of transactions does not comprise the dependencies, the method additionally includes logging a status for the set of transactions.

24 Claims, 10 Drawing Sheets

PCI TRANSACTION

- 402 — PCI COMMAND
- 404 — START ADDRESS
- 406 — END ADDRESS
- 408 — DATA
- 410 — COALESCE ENABLE
- 412 — RELOAD ENABLE
- 414 — DEPENDENT
- 416 — COMPLETE
- 418 — LINKED TRANSACTIONS
- 420 — ORDERED TRANSACTION
- 422 — TERMINATIONS
- 424 — FIXED ADDRESS
- 426 — PADDED

FIG 6

METHODS AND APPARATUS FOR MODELING AND VERIFYING A SET OF PCI BUS TRANSACTIONS

FIELD

The present invention relates in general to computer architecture technologies and in particular to methods and apparatus for modeling and verifying transactions across a PCI computer bus.

BACKGROUND OF THE INVENTION

Computers are an indispensable part of society. Initially quite costly, powerful computers today are practically a commodity, obtainable by anyone for just a few hundred dollars. A major reason for this ease of availability is the computer industry's standardization of component interfaces, such as the bus.

A computer component is a physical device that can be attached or removed from the computer, such as a video adapter or a network card. A bus is the data path on the computer's motherboard that interconnects the microprocessor with components through expansion slots, into which the components can be inserted. If properly designed, for a given computer architecture, two component devices from two different manufactures can be plugged into a bus on the same computer, and seamlessly work together.

Component suppliers have responded to computer price pressure by shortening their own development cycles and reducing material costs. Among the strategies used to reduce costs are the use modeling and verification tools during design, when changes can be made relatively quick and less costly.

Modeling permits a component developer to efficiently develop a large number of test cases, each representing a particular behavioral scenario in which to verify a specific design against. Without modeling, the developer would have to physically create a multiplicity of configurations, dramatically increasing costs and schedule delays.

Perhaps the most common component interface today is the PCI. It is in nearly all x86-based computers that are currently manufactured. PCI, or Peripheral Component Interconnect, was designed to sustain the high data transfer rated needed by modern components. PCI devices are designed to function as either a master or a slave. Master devices can initiate a bus transaction, while slave devices can only be targets, and "speak only when spoken to."

Generally speaking, the PCI includes at least two separate busses: an address/data bus and a command/byte enable bus. The address/data bus is 32 or 64 bits wide, and is used by a master device in order to write or read data to a memory location at another master or a slave device. This bus is also used to transfer the requested data. The command/byte enable bus is 4 or 8 bits wide, and is used to define the PCI command during the address phase of the transaction. It's also used for byte enabling during the data phase of the transaction, since not all of the bytes on the bus may contain valid data.

PCI-X, or Peripheral Component Interconnect Extended, is a new computer bus technology that further increases the speed that data can move within a computer, up to 1.06 GB/sec in the current implementation. In addition to many significant enhancements, PCI-X allows single transactions to be further split into multiple smaller transactions in order to optimize bus performance. For example, a master may be initiating a large multi-byte read transaction from a slave. After the first portion is transferred to the master, the slave may not be ready with the remaining portion. The master may tell the slave to transfer the remaining portion at a later time, and thus free up the PCI bus for another pending transaction. PCI-X is backwards-compatible, meaning that a PCI-X card can function on a standard PCI slot, at the regular PCI speed.

In the prior art, there have been attempts at modeling and verifying individual discrete PCI transactions. Attention has not been paid to modeling sets of PCI transactions, i.e., transactions that are coupled, linked, and combined with other PCI transactions in real-time during operation on the bus. This is in part because interdependent PCI transactions are particularly difficult to model and to verify efficiently and accurately. The present invention relates to methods and apparatus for efficiently and accurately modeling and verifying PCI transactions, including sets of interdependent PCI transactions.

SUMMARY OF THE INVENTION

The invention relates, in one embodiment, to a method for modeling and verifying a set of transactions between a set of master devices and a set of slave devices that are coupled via a bus. The method includes determining a set of dependencies for the set of transactions, executing the set of transactions on the bus, and observing the set of transactions for the dependencies. If the set of transactions does not comprise the dependencies, the method additionally includes logging a status for the set of transactions.

In another embodiment, the invention relates to an apparatus for modeling and verifying a set of transactions between a set of master devices and a set of slave devices that are coupled via a bus. The apparatus includes a means for determining a set of dependencies for the set of transactions, a means for executing the set of transactions on the bus, and a means for observing the set of transactions for the dependencies. The apparatus additionally includes a means for logging a status for the set of transactions, if the set of transactions does not comprise the dependencies.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
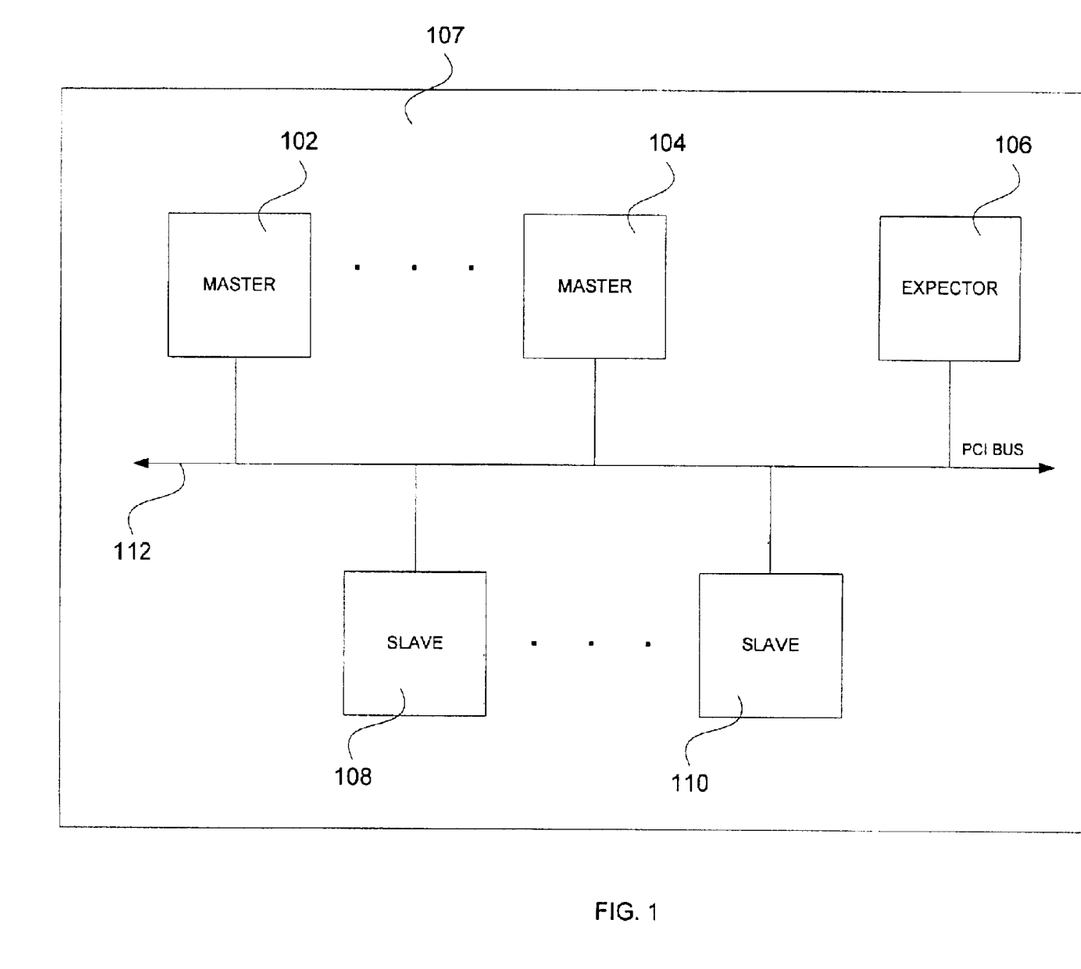
FIG. 1 illustrates, in accordance with one embodiment of the present invention, a simplified diagram showing two masters and two slaves coupled to a PCI bus.

The features and advantages of the present invention may be better understood with reference to the drawings and discussions that follow. FIG. 1 illustrates, in accordance with one embodiment of the present invention, a simplified diagram 107 showing two masters 102–104 and two slaves 108–110, are coupled to PCI bus 112. Master 102 may represent, for example, the device being tested and verified. Master 104 and slaves 108 and 110 may represent, for example, software or hardware versions of other devices that may be found coupled to PCI bus 112 in the real world. A test bench application running a plurality of test cases causes master 102 to interact with other devices (such as 104, 108, or 10) in a series of PCI transactions. Prior to execution, these test case transactions are called expected transactions. After execution, the test case transactions are called executed transactions or verification/modeling transactions. The test bench validates the test case by comparing expected transactions to executed transactions. Any differences are logged as variances or failures. The expector 106 is not part of the PCI specification, but rather a device used to monitor or snoop all the executed transactions on the PCI bus 112.

Figure 2A:
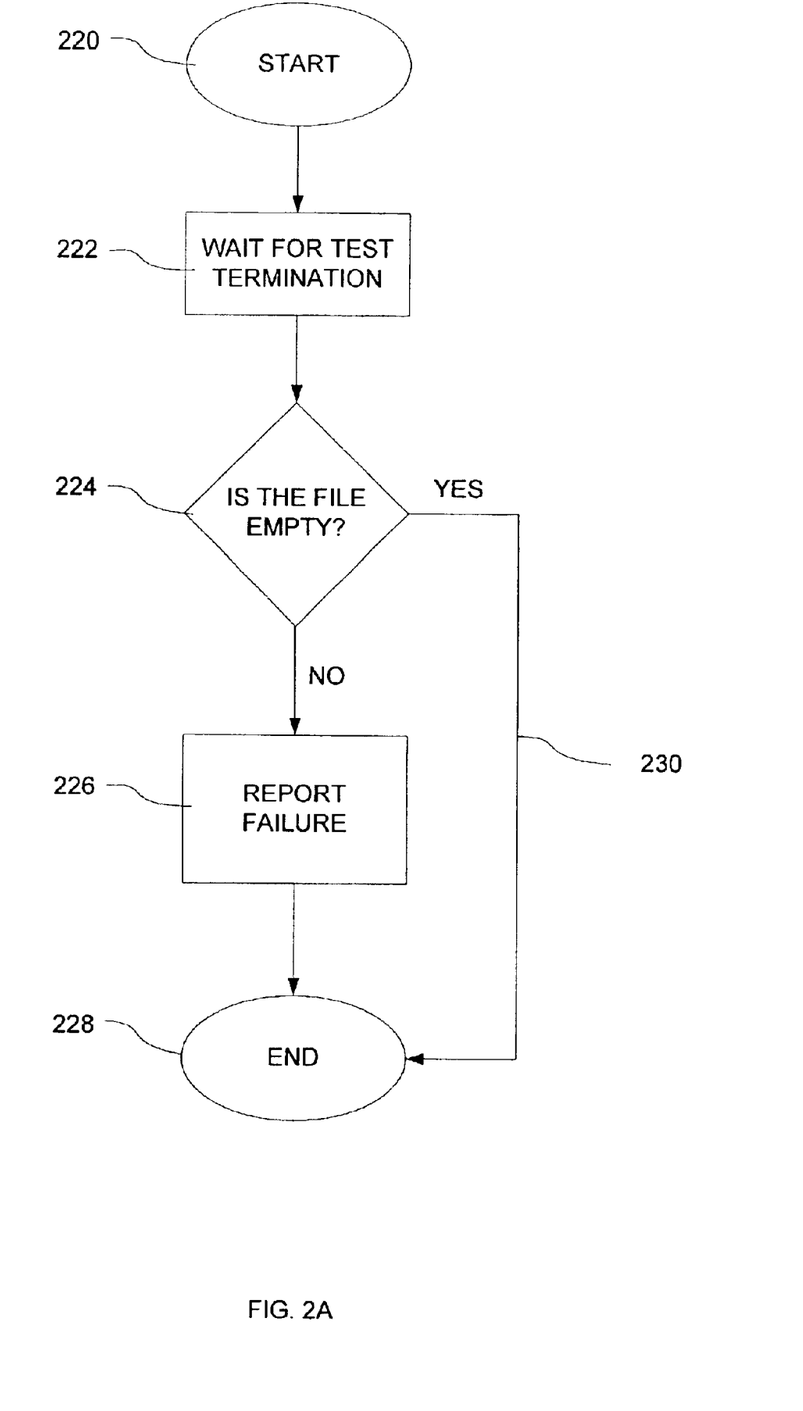
FIG. 2A illustrates, in accordance with one embodiment of the present invention, a simplified diagram showing the algorithm used in a thread of execution for a test case running on the test bench application.

FIG. 2A illustrates, in accordance with one embodiment of the present invention, a simplified diagram showing the algorithm used in a thread of execution for a test case running on the test bench application. The thread is spawned and begins execution at start 220. It then enters an execution loop and waits for the test case to complete, at step 222 (wait for test termination). Upon completion, the thread then inspects the test case configuration file to determine if all executed transactions have been completed, at step 224 (is the file empty). If all executed transactions have been successfully completed, the thread terminates at step 228 (end). If one or more executed transactions remain uncompleted in the test case, however, the thread reports this as a test failure to the test bench, at step 226 (report failure). It then terminates at step 228 (end).

Figure 2B:
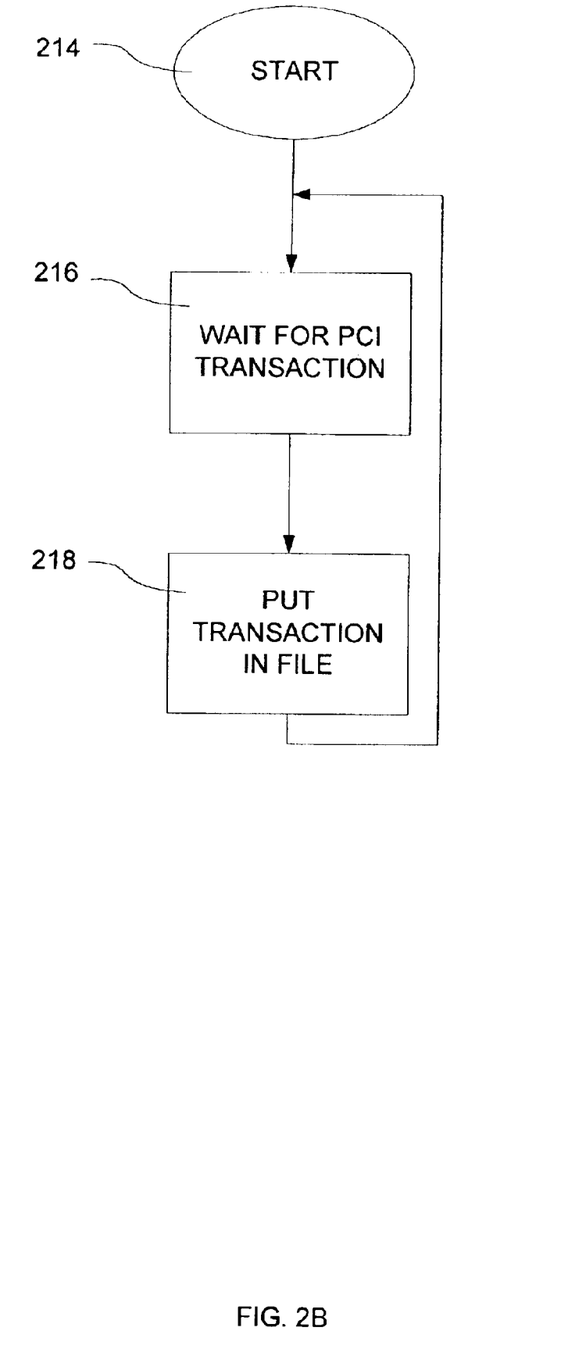
FIG. 2B illustrates, in accordance with one embodiment of the present invention, a simplified diagram showing the algorithm used in a thread of execution in which additional transactions are added to a test case during execution.

FIG. 2B illustrates, in accordance with one embodiment of the present invention, a simplified diagram showing the algorithm used in a thread of execution in which additional transactions are added to a test case during execution. In FIG. 2B, the thread is spawned and begins execution at step 214 (start). It then enters an execution loop in which it waits for an additional executed transaction, at step 216 (wait for PCI transaction). When an additional executed transaction is received, the thread updates the test case file with this information, at step 218 (put the transaction in file). It then re-enters the execution loop and again at step 216 (wait for PCI transaction).

Figure 2C:
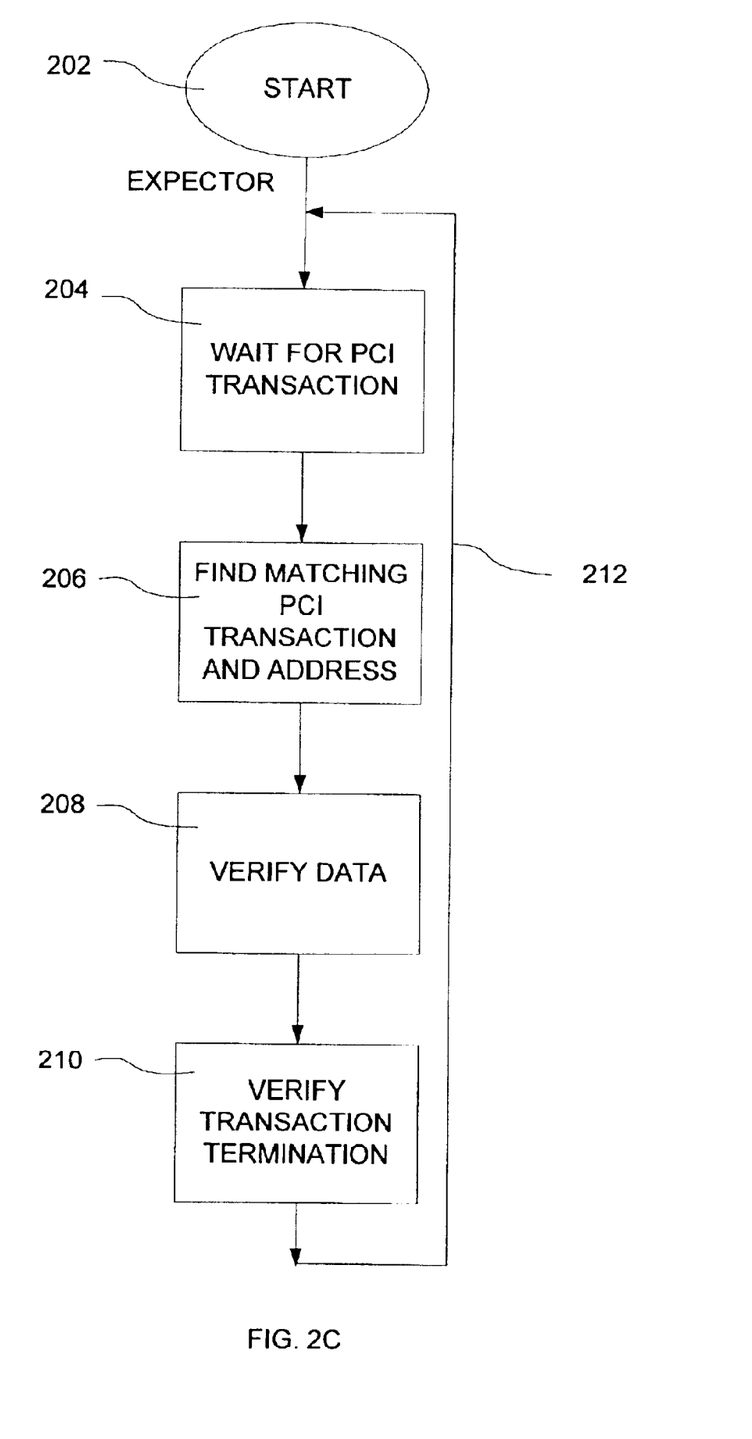
FIG. 2C illustrates, in accordance with another embodiment of the present invention, a simplified diagram showing the algorithm used in a thread of execution in which the expector compares an executed transaction to an expected transaction.

FIG. 2C illustrates, in accordance with another embodiment of the present invention, a simplified diagram showing the algorithm used in a thread of execution in which the expector compares an executed transaction to an expected transaction. Initially, the thread begins execution, at step 202 (start). It then waits for an executed transaction, at step 204 (wait for PCI transaction). When an executed transaction is identified, the thread compares the command and address information in the executed transaction to the expected transaction stored in the test case, at step 206 (find matching PCI command and address), and it verifies the data at step 208 (verify data). The thread then verifies that the executed transaction has completed, at step 210 (verify transaction termination), and re-enters the execution loop 212 and again at step 204 (wait for PCI command).

Figure 3:
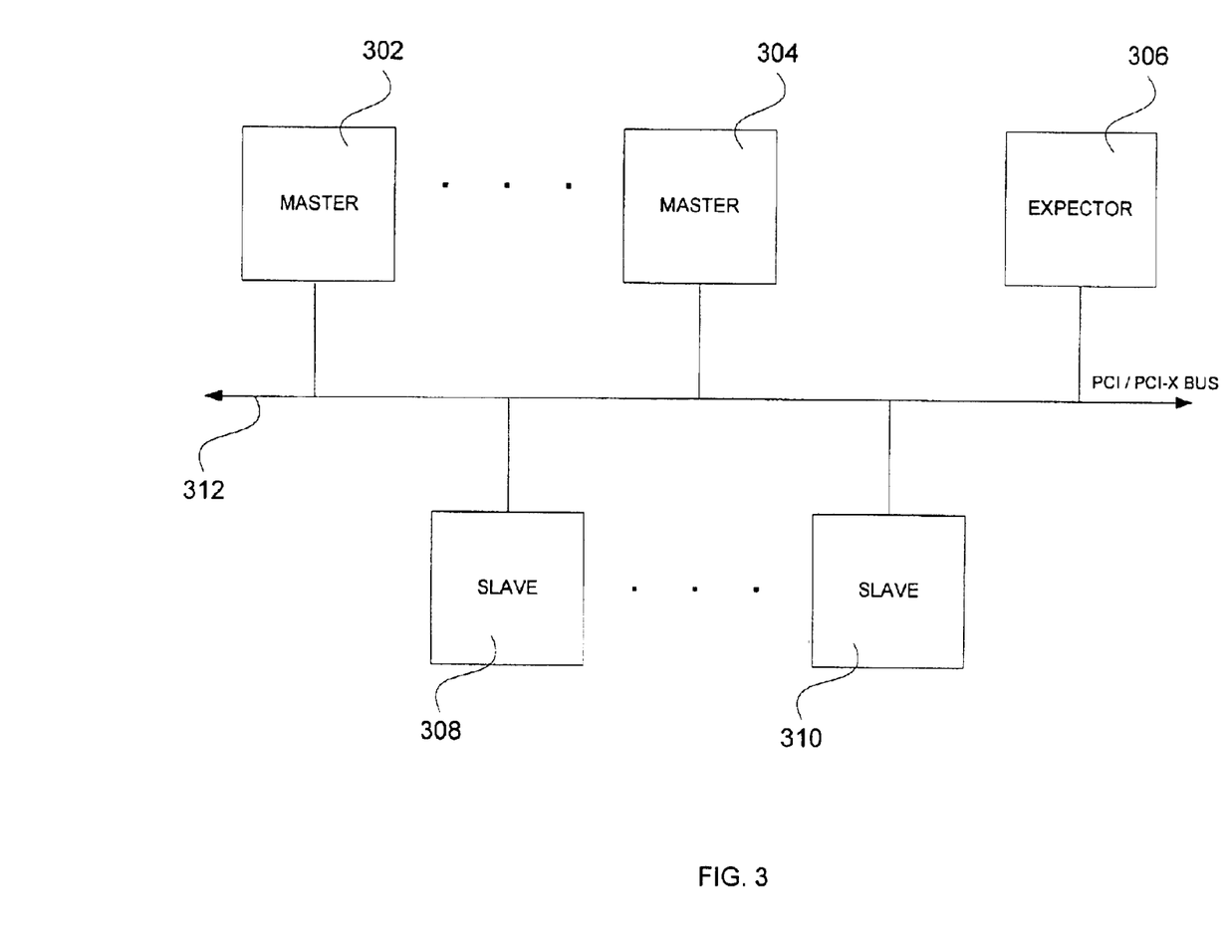
FIG. 3 illustrates, in accordance with another embodiment of the present invention, a simplified diagram showing the verification of a combined PCI/PCI-X bus with an expector and a test bench application.

FIG. 3 illustrates, in accordance with another embodiment of the present invention, a simplified diagram showing the verification of a combined PCI/PCI-X bus 312 with an expector 306 and a test bench application. As in FIG. 1, there are two masters 302–304, and two slaves 308–310 that are coupled to PCI/PCI-X bus 312.

As before in FIG. 1, the test bench monitors executed transactions on the fly through the expector 306. The expector 306 compares these executed transactions against the expected transactions, and reports any variances or failures.

Figure 4:
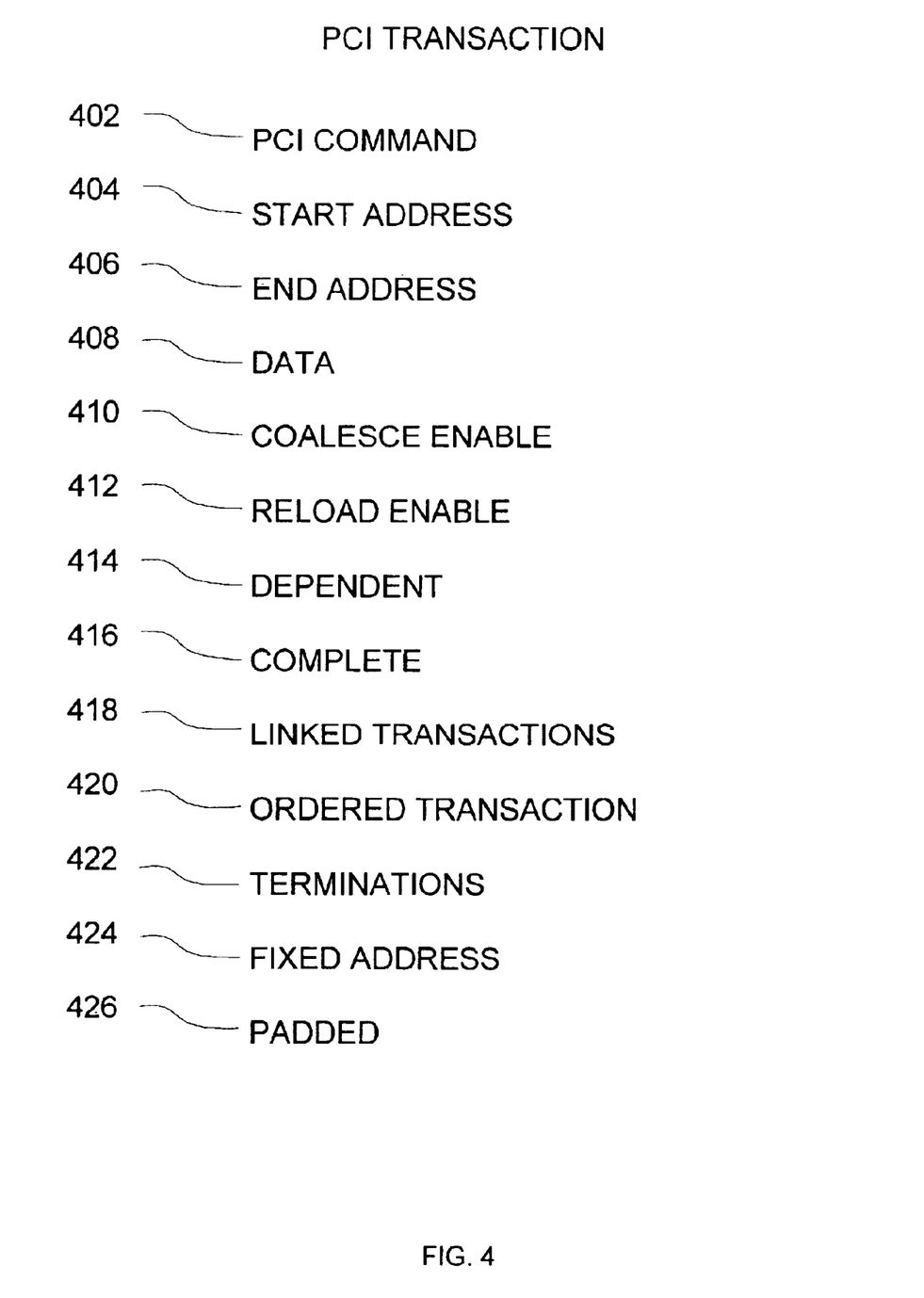
FIG. 4 illustrates in accordance with another embodiment of the present invention, a simplified diagram showing a PCI transaction data structure used by the test bench for each expected transaction in the test case.

FIG. 4 illustrates in accordance with another embodiment of the present invention, a simplified diagram showing a PCI transaction data structure used by the test bench for each expected transaction in the test case. As the test bench executes the test case, a PCI transaction data structure is instantiated for each expected transaction. The test bench then compares this information to each executed transaction, and reports any variances or failures. PCI command 402 stores the name of the command to be executed. Since the command/byte enable bus is 4 bits wide, there are potentially 16 values, although only 12 are currently defined. Typical commands are I/O Read, I/O Write, Memory Read, and Memory Write. Terminations 422 comprises a list of the expected terminations, such as: normal, disconnect, disconnect with data, split, etc.

Address information stored in start address 404 and end address 406. These are 64 bits in length, for a potential addressable memory space of 2$^{64}$. The end address 406 information is stored in order to properly model a PCI transaction that can place data in an address range, as opposed to placing the data at a fixed address. The actual data to be written or read is stored in 408.

The PCI transaction data structure also contains several true/false flags in order to properly model the executed transaction. The first is coalesce enable 410 which signals to the test bench that this transaction can be combined with other transactions with contiguous addresses. The second is reload enable 412 which signals to the test bench that this transaction can go back and re-read any portion of data that has already been read. The third is dependent 414 which signals to the test bench that the executed transaction when completed is still not finished, since other related transactions need to occur after it. The fourth is complete 416, which signals to the test bench that the executed transaction has finished. The fifth is padded 426, which signals if a transaction may have a variable number of data bytes read after the termination of the expected data. The sixth is fixed address 424, which signals to the test bench that the data of the executed transaction will only be written to a fixed memory address.

The PCI transaction data structure also contains two pointers that point to lists of other executed transactions that are dependent in time with the current the executed transaction. The linked transactions 418 pointer redeems a list of the executed transactions stored in a memory buffer the must occur before the current the executed transaction. Whereas the ordered transactions 420 pointer redeems a list of the executed transactions stored in a memory buffer the must occur after the current executed transaction.

Figure 5A:
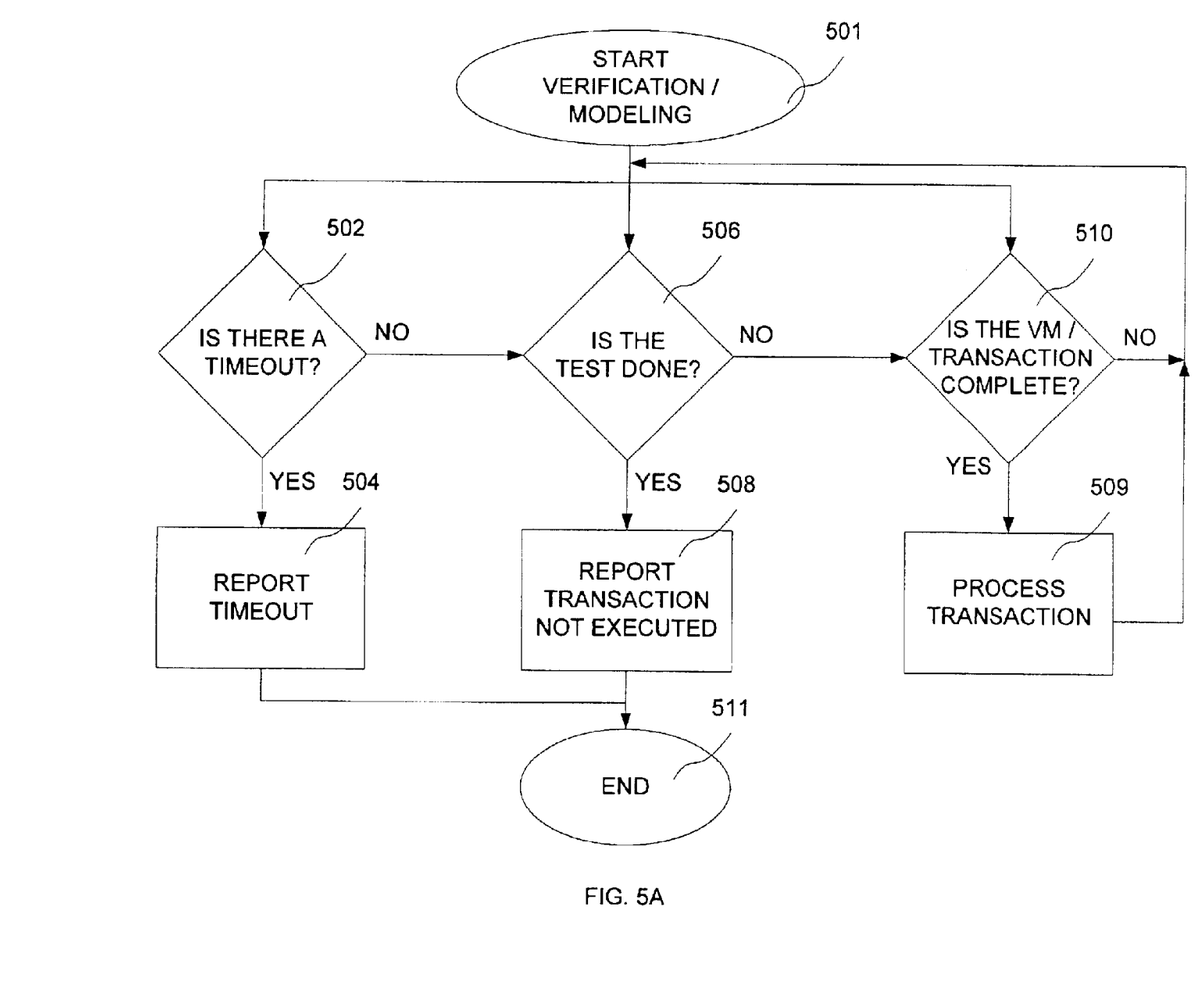
FIG. 5A illustrates, in accordance with another embodiment of the present invention, a simplified diagram showing the algorithm used by the test bench application to run a test case.

FIG. 5A illustrates, in accordance with another embodiment of the present invention, a simplified diagram showing the algorithm used by the test bench application to run a test case. The test bench begins running the test case at step 501 (start verification/modeling). At this point, three simultaneous tests are done. One test case checks to see if the test case is stalled at step 502 (is there a timeout). If a timeout occurs, it is reported at step 504 (report timeout), and the algorithm is terminated at step 511 (end). A second test checks for completion of the test case, at step 506 (is the test done). If the test case completes, it is reported to the test bench, at step 508 (report transaction not executed), and the algorithm is again terminated at step 511 (end). A third test checks for completion of an individual transaction within the test case, at step 510 (is the vm/transaction complete). If the transaction is complete, it is processed at step 509 (process transaction). The algorithm then loops back to start again. If the transaction is not complete, the algorithm simply loops back without processing.

Figure 5B:
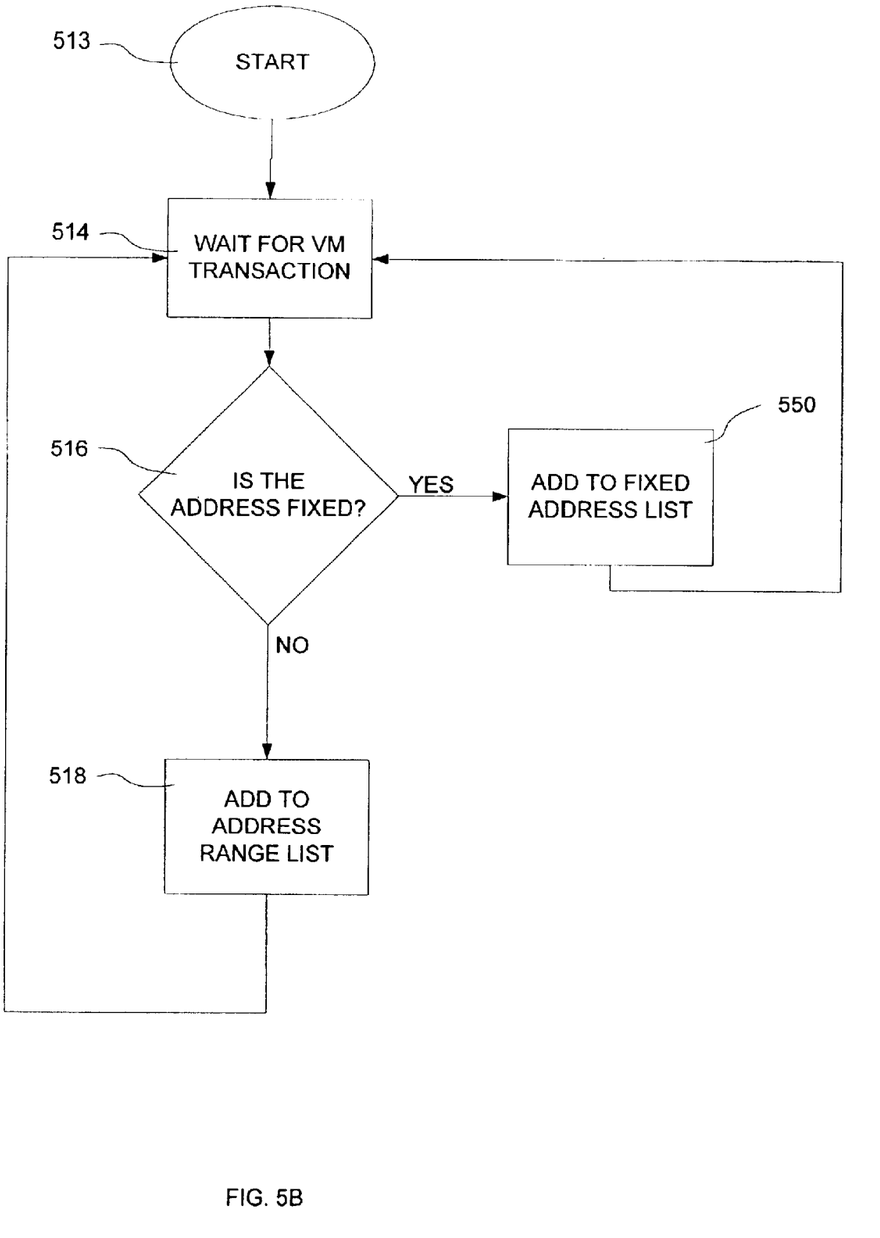
FIG. 5B illustrates, in accordance with another embodiment of the present invention, a simplified diagram showing the algorithm used by the test bench application to distinguish between expected transactions with fixed address from those with an address range.

FIG. 5B illustrates, in accordance with another embodiment of the present invention, a simplified diagram showing the algorithm used by the test bench application to distinguish between expected transactions with fixed address from those with an address range. The test bench begins running at step 513 (start). It then waits for an expected transaction, at step 514 (wait for vm transaction). The algorithm then checks to see if the expected transaction address is a specific fixed address, at step 516 (is the address fixed). If so, it is added to the fixed address list of the test case, at step 550 (add to fixed address list). If not, the address refers to an address range, and is added to the address range list, at step 518 (add to address range). In both cases, the algorithm re-enters the execution loop, and again waits for another expected transaction, at step 514 (wait for vm transaction).

Figure 5C:
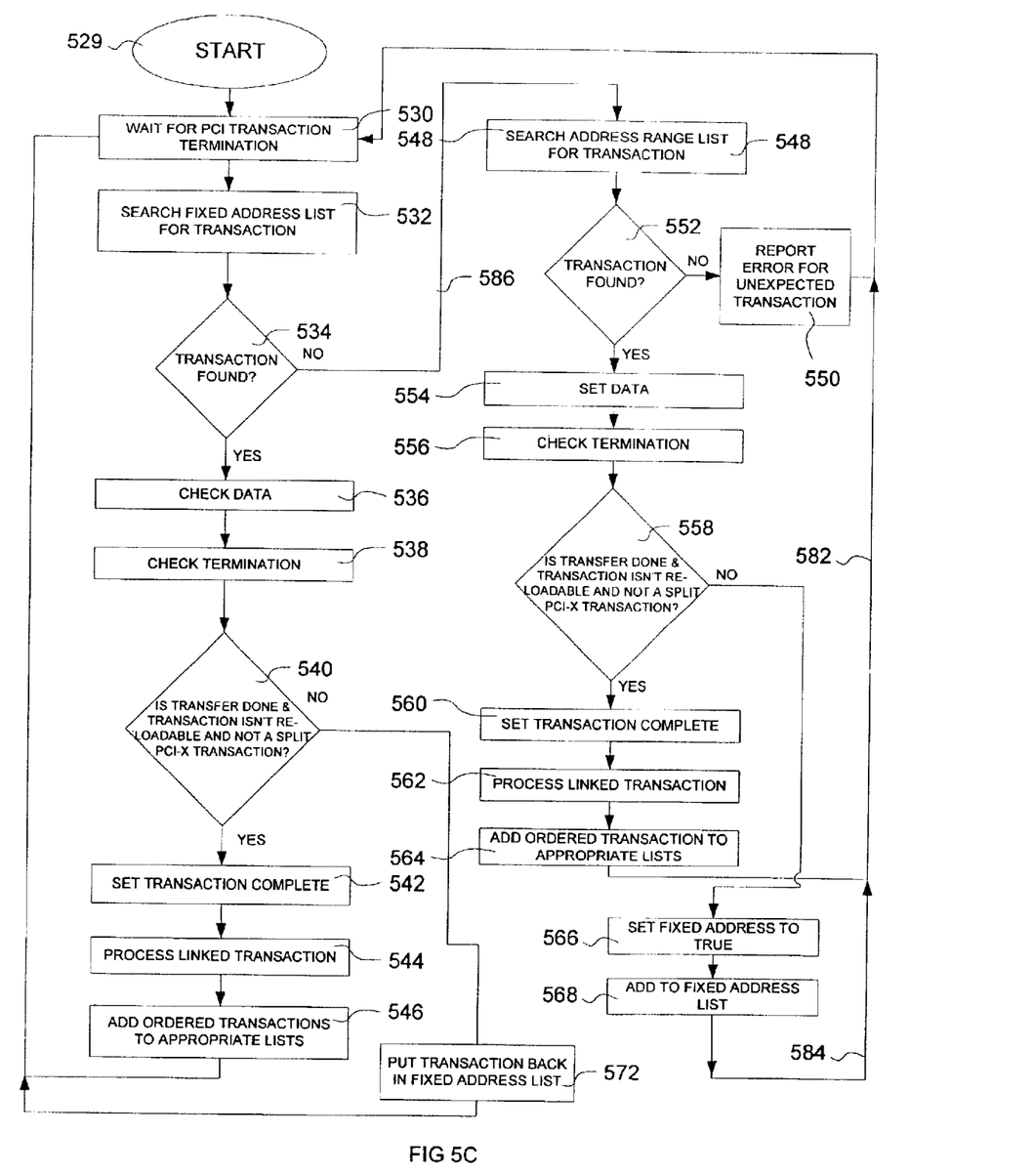
FIG. 5C illustrates, in accordance with another embodiment of the present invention, a simplified diagram showing main algorithm used by the expector to verify each executed transaction against the set of expected transactions in the test case; and, FIG. 6 illustrates, in accordance with another embodiment of the present invention, the process used by the expector to match an executed transaction to an expected transaction is described.

FIG. 5C illustrates, in accordance with another embodiment of the present invention, a simplified diagram showing main algorithm used by the expector to verify each executed transaction against the set of expected transactions in the test case.

The expector begins the algorithm at step 529 (start). It then enters an execution loop waited for the executed transaction to complete, at step 530 (wait for PCI transaction termination). Once the executed transaction completes, it extracts the address and compares it to the set of known fixed addresses stored in a list, at step 532 (search fixed address list for transaction). If a fixed address is not found, then the address is in an address range. This branch of the algorithm will be discussed later. However, if a fixed address is found, then the algorithm continues and further compares the data in the executed transaction to the data of the appropriate expected transaction in the list, at step 536 (check data). The expector then checks for transaction termination, at step 538 (check termination). A transaction can terminate normally, can be split into two or more separate smaller transactions, or can be disconnected by the PCI bus controller prior to completion.

At this point, three checks are done. The first checks to see if the data transfer is completed. The second checks to see if the executed transaction is not re-loadable. And the third check determines whether the transfer is not a split PCI-X transaction. All three are accomplished at step 540 (is transfer done . . . ). If the answer to all three is yes, the expector notes that the transaction is complete, at step 542 (set transaction complete), processes any other transactions that are linked to it, at step 544 (process linked transaction), and then adds any ordered transactions that are associated with this transaction to the appropriate lists, at step 546 (add ordered transactions to appropriate lists). As previously described, ordered transactions are those that must occur after the termination of the present transaction. Once put on the appropriate lists, the ordered transactions are also queued to begin execution on the PCI bus. The expector then enters an execution loop in which it waits for an additional the executed transaction to terminate, at step 530 (wait for PCI termination transaction).

If the answer to the previous step 540 (is transfer done . . . ) is no, then the transaction is placed back in the fixed address list, at step 572 (put transaction back in fixed address list), and the expector again enters an execution loop in which it waits for an additional executed transaction to terminate, at step 530 (wait for PCI termination transaction).

The branch wherein the address was not found on the fixed address list at step 534 (transaction found) will now be discussed. The transaction address is searched across the address range list, in step 548 (search address range for transaction). If the address is not found, an error is reported to the test bench, at step 550 (report error for unexpected transaction). The expector then enters an execution loop, as before, in which it waits for an additional executed transaction to terminate, at step 530 (wait for PCI termination transaction).

If the address range is found for the executed transaction, the data is updated in the test case, at step 554 (set data). This is important since the expected data supports wildcards. The expector then checks for transaction terminations, at step 556 (check for terminations).

At this point, as in the other branch, three checks are done. The first determines data transfer completion. The second check determines if the executed transaction is not re-loadable. And the third check determines if the transfer is not a split PCI-X transaction. All three are accomplished at step 558 (is transfer done . . . ). If the answer to all three is yes, the expector notes that the transaction is complete, at step 560 (set transaction complete), processes any other executed transaction that are linked to it, at step 562 (process linked transaction), and then adds any ordered transactions that are associated with this executed transaction to the appropriate lists, at step 564 (add ordered transactions to appropriate lists). The expector then enters an execution loop in which it waits for an additional executed transaction to terminate, at step 530 (wait for PCI termination transaction).

If the answer to step 558 (the previous step is transfer done . . . ) is no, then the fixed address field in the PCI transaction data structure set to TRUE, at step 566 (set fixed address to true). The executed transaction address is added to the fixed address list, at step 568 (add to fixed address list), and the expector again enters an execution loop in which it waits for an additional executed transaction to terminate, at step 530 (wait for PCI termination transaction).

Figure 6:
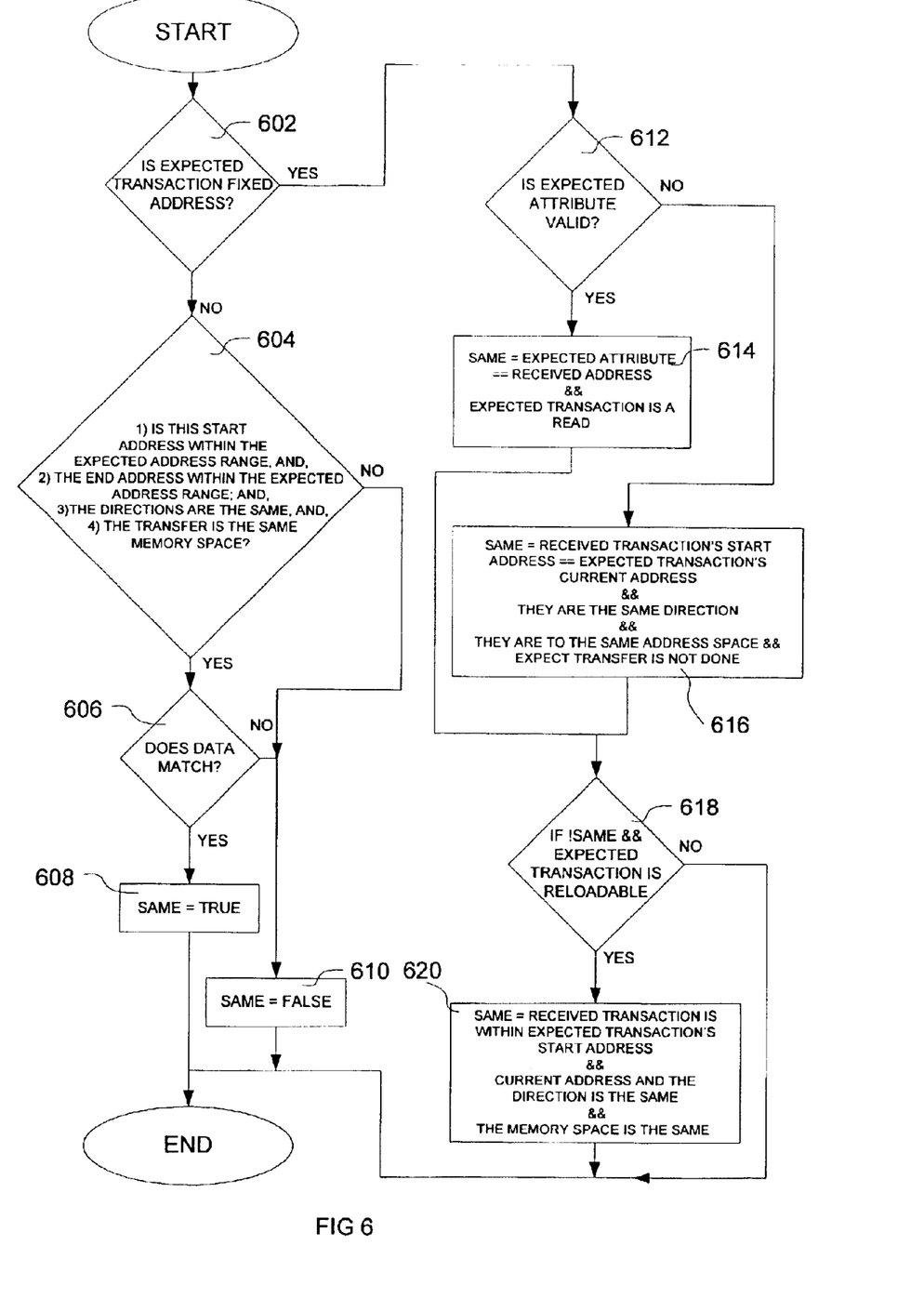

Referring now to FIG. 6, the process used by the expector to match an executed transaction to an expected transaction is described. This algorithm is an expansion of steps 532 (search fixed address list for transaction) and 548 (search address range for transaction) in FIG. 5C.

Initially, the executed transaction is checked to determine if it contains a fixed address, at step 602 (is expected transaction fixed address). If not, four checks are done. The first determines if the start address of the executed transaction is within the expected address range. The second determines if the end start address of the executed transaction is within the expected address range. The third determines if the executed transaction matches the direction of the expected transaction in the test case. That is, that both transactions are a read or a write. The fourth determines whether the data transfer of the executed transaction is to the same memory space of the expected transaction. All four checks occur at step 604 (is this start address within the expected address space . . . ).

The data of the executed transaction is then compared to the data of the expected transaction, at step 606 (does data match). If this is also true, then the executed transaction matches the expected transaction, and the same variable is set to true, at step 608 (same=true). That is, both transactions are in fact, the same.

If either step 604 is (this start address within the expected address space . . . ) or 606 (does data match) are false, then the executed transaction does not match the expected transaction in the test case, and the same variable is set to false, at step 610 (same=false).

Referring now to the previous step 602 (is expected transaction fixed address). If this step is true, the validity of the expected attribute is checked at step 612 (is expected attribute valid). At this stage the same variable is calculated in one of several ways, depending on the outcome. If the expected attribute is valid, a two-part check is done at step 614 (same=expected attribute . . . ). The first check compares the expected attribute to the received address. The second determines whether the expected transaction is a read transaction. If both are true, then same=true.

If the expected attribute test at step 612 (is expected attribute valid) is false, then a four-part check is done at step 616 (same=received transaction's start . . . ). First, the executed transaction's start address is compared to the expected transaction's current address. Second, both transactions are compared for direction. That is, that they must be either a read, or a write. Third, the address of each is compared for the same address space. And fourth, the executed transaction must not be completed. If all are true, then same=true.

The next step determines whether the algorithm can complete, or whether the same variable needs to be calculated yet again, at step 618 (if !same && expected transaction is reloadable). If the previously calculated same variable from either step 614 (same=expected attribute . . . ), or 616 (same=received transaction's start . . . ) is true, or the transaction is not re-loadable, then the branch is no, and algorithm completes. If the same variable was calculated in previous steps to false, and the transaction is re-loadable, then the same variable must be recalculated in a three-step process at step 620 (same=received transaction is within . . . ). The first check compares the executed transaction to the expected transaction's start address. The second check compares the directions of both transactions. That is, both must be a read or a write. The third check determines whether the address of the executed transaction is in the same address space as the expected transaction. And the fourth check, determines whether the expected transfer is not complete. If all are true, then same=true, and the algorithm completes.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

Advantages of the invention include the ability to model and verify transactions across a PCI computer bus, including sets of interdependent PCI transactions.

What is claimed is:

1. A method for modeling and verifying a set of transactions between a set of master devices and a set of slave devices, said set of master devices are coupled to said set of slave devices via a bus, comprising:

determining a set of dependencies for said set of transactions;

executing said set of transactions on said bus;

observing said set of transactions for said dependencies such that actual execution of said transactions may be compared with said determined set of dependencies for said set of transactions;

if said set of transactions does not comprise said dependencies, logging a status for said set of transactions.

2. The method of claim 1, wherein said set of dependencies comprise a data dependency.

3. The method of claim 2, wherein said set of dependencies comprise an order transaction dependency.

4. The method of claim 3, wherein said set of dependencies are stored in a software structure.

5. The method of claim 4, wherein said set of transactions comprises a set of linked transactions, said software structure comprises a first pointer, said first pointer can redeem said set of linked transactions.

6. The method of claim 5, wherein said set of transactions comprises a set of ordered transactions, said software structure comprises a second pointer, said second pointer can redeem said set of ordered transactions.

7. The method of claim 6, wherein said set of master devices and a said set of slave devices are modeled in a software language.

8. The method of claim 7, wherein said software language is Verilog.

9. The method of claim 7, wherein said software language is VHDL.

10. The method of claim 6, wherein said bus is a PCI bus.

11. The method of claim 6, wherein said bus is a PCI-X bus.

12. The method of claim 6, wherein said bus is a bus other than a PCI bus.

13. A apparatus for modeling and verifying a set of transactions between a set of master devices and a set of slave devices, said set of master devices are coupled to said set of slave devices via a bus, comprising:

a means for determining a set of dependencies for said set of transactions;

a means for executing said set of transactions on said bus;

a means for observing said set of transactions for said dependencies such that actual execution of said transactions may be compared with said determined set of dependencies for said set of transactions;

a means for logging a status for said set of transactions, if said set of transactions does not comprise said dependencies.

14. The apparatus of claim 13, wherein said set of dependencies comprise a data dependency.

15. The apparatus of claim 14, wherein said set of dependencies comprise an order transaction dependency.

16. The apparatus of claim 15, wherein said set of dependencies are stored in a software structure.

17. The apparatus of claim 16, wherein said set of transactions comprises a set of linked transactions, said software structure comprises a first pointer, said first pointer can redeem said set of linked transactions.

18. The apparatus of claim 17, wherein said set of transactions comprises a set of ordered transactions, said software structure comprises a second pointer, said second pointer can redeem said set of ordered transactions.

19. The apparatus of claim 18, wherein said set of master devices and a said set of slave devices are modeled in a software language.

20. The apparatus of claim 19, wherein said software language is Verilog.

21. The apparatus of claim 19, wherein said software language is VHDL.

22. The apparatus of claim 18, wherein said bus is a PCI bus.

23. The apparatus of claim 18, wherein said bus is a PCI-X bus.

24. The apparatus of claim 18, wherein said bus is a bus other than a PCI bus.

* * * * *